United States Patent [19]

Cassens, Jr. et al.

[11] 3,868,261

[45] Feb. 25, 1975

[54] REFRACTORY MOTOR

[75] Inventors: Nicholas Cassens, Jr., Pleasanton; Joseph E. Neely, Los Gatos, both of Calif.

[73] Assignee: Kaiser Aluminum & Chemical Corporation, Oakland, Calif.

[22] Filed: Nov. 15, 1973

[21] Appl. No.: 416,090

[52] U.S. Cl. ............................................... 106/59
[51] Int. Cl. ............................................ C04b 35/42
[58] Field of Search ....................................... 106/59

[56] References Cited
UNITED STATES PATENTS

| | | | |
|---|---|---|---|
| 3,470,004 | 9/1969 | Begleg et al. | 106/59 |
| 3,594,199 | 7/1971 | Treffner et al. | 106/59 |

*Primary Examiner*—J. Poer
*Attorney, Agent, or Firm*—Paul E. Calrow; Malcolm McQuarrie

[57] ABSTRACT

A basic refractory mortar with high refractoriness and low shrinkage is made from a prereacted magnesia-chrome grain containing from 40 to 80% MgO and sized so that all of it passes a 35 mesh screen and from 25 to 75% passes a 325 mesh screen. In addition to the prereacted grain, the mortar contains up to 13% $Cr_2O_3$, from 0.5 to 1.5% dextrin, and from 0.1 to 0.5% methyl cellulose. The amount of −325 mesh prereacted grain and the amount of $Cr_2O_3$ are chosen to control the amount of shrinkage, shrinkages of less than 1% upon heating to 1650°C being obtainable.

14 Claims, 6 Drawing Figures

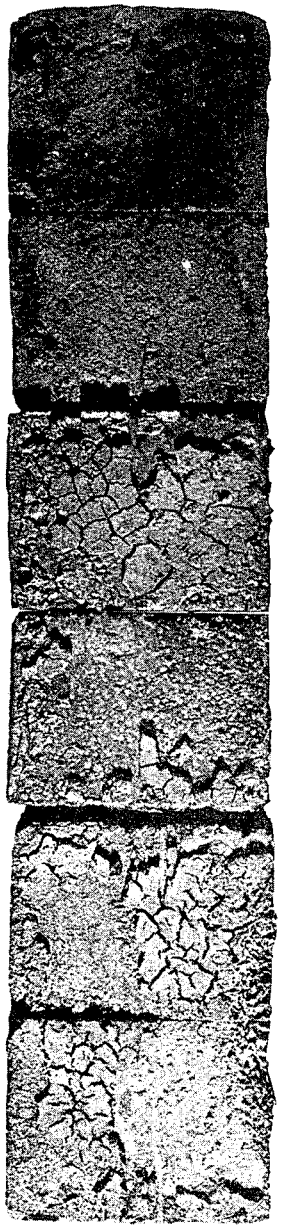
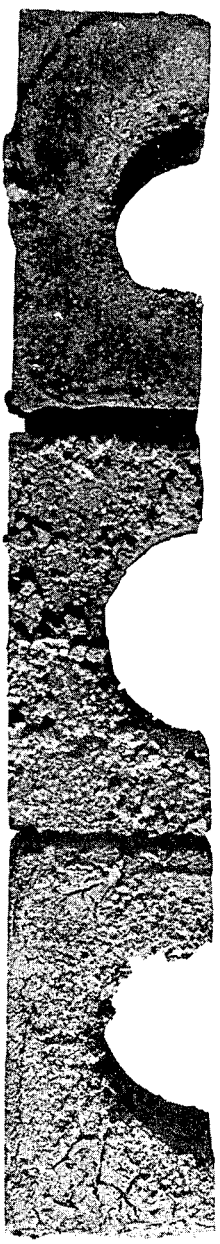
FIG. 1  FIG. 2  FIG. 3
FIG. 1a  FIG. 2a  FIG. 3a

REFRACTORY MOTOR

BACKGROUND OF THE INVENTION

This invention concerns refractory mortars, and particularly such mortars containing chrome and magnesia.

Refractory mortars are used to fill joints between refractory brick and generally consist of relatively finely divided refractory material together with a binder such as sodium silicate and a suspending agent such as clay. For example, it is known to make refractory mortars from −28 mesh chrome ore, sodium silicate, and clay, as set forth in U.S. Pat. Nos. 1,514,812 and 3,208,862. Similarly, it is known to make refractory mortars using magnesite or periclase instead of chrome ore as the refractory ingredient. It is also known to make refractory mortars from mixtures of chrome ore and magnesia, and it has been suggested in U.S. Pat. No. 3,470,004 to make a mortar using fused grain made by melting a mixture of chrome and magnesia.

One problem with mortars made as described above using binders such as sodium silicate and suspending agents such as clay, is that they are less refractory than desired since both sodium silicate and clay, as well as other binder and suspension ingredients which might be used, are low melting and thus reduce the refractoriness of the overall composition compared to that of the refractory material itself.

Other desirable characteristics of a refractory mortar are that it be plastic (i.e., easily worked with a trowel) after mixing with water, that it not settle out of suspension when diluted with water to a dipping consistency, that it have relatively little shrinkage upon heating to its use temperature, and that it resist erosion of the joints between refractory brick.

Plasticity in a mortar is generally achieved by relatively fine grinding of the refractory and other ingredients. Thus, for example, refractory mortars are generally all finer than 28 mesh, often finer than 48 mesh, and sometimes substantially all finer than 100 mesh. In addition, plasticity is obtained by adding plasticizing agents such as clay or methyl cellulose. Fine grinding of a mortar also aids in preventing settling when it is diluted to dipping consistency. Also, the addition of suspending agents such as dextrin assists in preventing settling.

However, in general, the finer the refractory aggregate in a mortar, the greater its shrinkage upon heating to an elevated temperature, other things being equal. Thus, one problem in designing a refractory mortar is to obtain the desired nonsettling characteristics without introducing undue shrinkage.

It is to the solution of the foregoing problems found in prior art refractory mortars, particularly those mortars made from chrome and magnesia, that the present invention is directed.

SUMMARY OF THE INVENTION

It has now been found, according to this invention, that a heat setting refractory mortar with good suspension properties and low shrinkage is made from a composition consisting essentially of: (1) from 85 to 99.4% prereacted magnesia-chrome grain containing from 40% to 80% MgO, said grain being substantially all finer than 35 mesh and containing from 25 to 75% −325 mesh material; (2) up to 13% $Cr_2O_3$, substantially all of which passes a 325 mesh screen; (3) from 0.5 to 1.5% dextrin; and (4) from 0.1 to 0.5% methyl cellulose; the amount of $Cr_2O_3$ and the percentage of prereacted grain finer than 325 mesh being such that the linear shrinkage of the mortar upon heating to 1650°C is not over 5%; all percentages of the materials in the composition being by weight and based on the total weight of the composition.

BRIEF DESCRIPTION OF THE DRAWING

The drawing shows various mortar joints after a slag reaction test, comparing the mortar of this invention with prior art mortars.

DETAILED DESCRIPTION

The refractory grain used in making the mortar of this invention is a prereacted grain made by sintering chrome ore and a source of magnesia at high temperature, for example at 1950°C or higher. Preferably the chrome ore and magnesia source are both finely divided, for example substantially all passing a 100 mesh screen and at least 50% passing a 325 mesh screen. The materials may be compacted prior to firing to form the prereacted grain. The amount of chrome ore and magnesia source are chosen to yield a grain of the desired MgO content between 40 and 80% MgO, on the basis of the fired grain. A particularly useful grain in the practice of this invention is one made from Masinloc chrome concentrates and calcined magnesia in roughly equal weight proportions so as to yield a prereacted grain containing about 60% MgO.

The sizing of the grain used in the mortar of this invention is particularly important. It will substantially all pass a 35 mesh screen and from 25 to 75%, preferably from 25 to 50% will pass a 325 mesh screen. Control of the amount of −325 mesh prereacted grain is critical to the practice of the present invention, particularly with regard to volume stability or shrinkage control, as will be explained below.

The $Cr_2O_3$ used in the practice of this invention is not to be confused with chrome ore. The latter is a naturally occurring material which contains various oxides including $Al_2O_3$, MgO, and $Fe_2O_3$, and generally contains less than 50% $Cr_2O_3$. The chrome oxide used in the practice of this invention is a synthetic material containing at least 95% $Cr_2O_3$. It is used in finely divided form, substantially all passing a 325 mesh screen, a preferred material having an average particle size of 1.5 microns or less. The $Cr_2O_3$ is used in an amount up to 13% by weight of the total mortar composition, preferably from 8 to 12%. As will be discussed below, there is a relationship between the amount of $Cr_2O_3$ used in the mortar and the amount of −325 mesh prereacted grain in controlling shrinkage. In addition to its role in controlling shrinkage, $Cr_2O_3$ enhances the slag resistance of the mortar.

The dextrin used in the mortar of this invention is a well known, commercially available material which is used in the form of a water soluble powder.

The methyl cellulose used in this mortar is also a standard article of commerce (for example the material sold under the trade name Methocel 65 HG by Dow Chemical Company). It too is used in the form of a powder.

In practice, the dry ingredients of the mortar will be thoroughly admixed by a refractories manufacturer, packaged, and shipped to the user, who will add an appropriate amount of water at the time of use.

It was observed that when the prereacted grain was sufficiently fine (over 55% −325 mesh) so that a low settling rate (determined according to the test described below) was obtained after dilution of the mortar to dipping consistency (a viscosity of between 1500 and 2000 centipoises), then the shrinkage was excessive (e.g. 5% or more on a linear basis) when no $Cr_2O_3$ was included in the mortar. On the other hand, inclusion of $Cr_2O_3$ reduced the linear shrinkage for a given degree of fineness of the mortar. As a result of testing many different compositions, it was determined that the per cent linear shrinkage (S), per cent $Cr_2O_3$ (C), and per cent of the prereacted grain which passed a 325 mesh screen (F) were related by the following empirical equation:

$$S = 0.095F - 0.027C^2. \quad (1)$$

This equation predicts shrinkage values for any given per cent $Cr_2O_3$ and −325 mesh prereacted grain to within 0.2%, on the average, over the range from 0 to 10% $Cr_2O_3$ and 25 to 75% −325 mesh prereacted grain. This is within the accuracy of the shrinkage measurements themselves, which is of the order of ±0.3%.

From equation (1), it can be determined that, in order to have a mortar with less than 1% linear shrinkage, for example, the amount of $Cr_2O_3$ and −325 mesh prereacted grain must have the following relation:

$$0.095F - 0.027C^2 \quad 1. \quad (2)$$

EXAMPLE

Prereacted grain was made by admixing Masinloc chrome ore concentrates, 95% of which passed a 325 mesh screen, with magnesium hydroxide produced from sea water, all of the hydroxide passing a 325 mesh screen, and firing the admixture to a temperature of 2000°C in a rotary kiln. The grain so produced was ground so that 35% of it passed a 325 mesh screen, substantially all of it passing a 48 mesh screen. To 88.9 parts of this prereacted grain were added 9.8 parts $Cr_2O_3$, 1 part dextrin, and 0.3 part Methocel 65 HG. This mortar was mixed with 26% water, based on the weight of the dry ingredients, to a trowelling consistency and troweled into molds 3 long, ¾ wide, and ½ inch deep, as called for by U.S. Steel Test Method ARL IR-70. The bars thus formed were dried at 105°C for 12 hours and then fired to 1650°C in 6 hours with a 5 hour soak. After cooling to room temperature, the bars showed an average linear shrinkage of 1.0%.

The same composition was mixed with 37.5% water, again on the basis of the dry ingredients, to a dipping consistency having a viscosity of 1980 centipoises, in accordance with U.S. Steel Test ARL 17P-70. The slurry was then poured into a 1000 ml beaker and allowed to sit for 24 hours; it showed 10.5% settling, determined by dividing the volume of clear supernatant liquid after 24 hours by the total volume of the suspension. A value less than 20% is considered acceptable in a mortar at dipping consistency.

A slag test was carried out by mortaring together two 4½ × 2¼ × 3 inch pieces of direct bonded 60% MgO magnesia-chrome brick to form a 4½ × 4½ × 3 inch base. On top of this base, oriented with the mortar joint vertical, was mortared a 4½ × 4½ × 1½ inch piece of the same brick with a 2½ inch diameter hole cut through the 1½ inch dimension. In the "cup" provided by this structure were placed about 200 grams of a slag containing 30% CaO, 50% $SiO_2$, 10% $Al_2O_3$ and 10% FeO. The assemblage was fired to 1700°C for 1½ hours.

After firing, the samples were cut vertically down the middle, the cut being at right angles to the vertical joint in the base portion. The top, cup-forming, portion of the specimen was then removed from the base so that the horizontal joint could be examined. Also, the two pieces of the base were also separated so that the vertical joint could be examined. The results (Specimen I) are shown in FIGS. 3 and 3a. FIG. 3a shows the horizontal joint between the base and the upper section with the hole, looking at the bottom of the upper section. FIG. 3 shows the vertical joint (looking at both sides) in the base. Careful examination of the base pieces near their lower edge shows the effect of reaction between the slag and the brick.

Also shown, for comparison purposes, are specimens of the same brick tested in the same way at the same time, but using, in the case of Specimen II, shown in FIGS. 2 and 2a, an air-set mortar made from periclase containing 98% MgO and bonded with sodium tripolyphosphate and bentonite, and in Specimen III, shown in FIGS. 1 and 1a, a heat-set mortar made from chrome ore bonded with bentonite. Both these latter two comparison mortars are commercially available products. It can be seen that they underwent markedly more shrinkage and cracking than the mortar of the present invention.

In summary, it can be seen that the mortar of this invention has many advantages over prior art mortars. It exhibits better refractoriness than mortars made with binders and suspending agents such as sodium silicate and clay, since its only non-refractory ingredients are organic materials which burn out at relatively low temperatures and do not lower the softening temperature of the refractory ingredients. It exhibits better resistance to erosion than a mortar of similar chemical composition made from an admixture of chrome ore and periclase because it uses prereacted grain and $Cr_2O_3$. Finally, because of the careful control of the degree of fineness of the prereacted grain and the amount of $Cr_2O_3$, it combines volume stability upon firing with the ability to remain in suspension when diluted to dipping consistency.

In the specification and claims, percentages and parts are by weight unless otherwise indicated. Mesh sizes referred to herein are Tyler standard screen sizes which are defined in Chemical Engineers' Handbook, John H. Perry, Editor-in-Chief, Third Edition, 1950, published by McGraw Hill Book Company, at page 963. For example, a 35 mesh screen opening corresponds to 0.416 mm, and 325 mesh to 44 microns.

What is claimed is:

1. A heat setting refractory mortar composition consisting essentially of: (1) from 85 to 99.4% prereacted magnesia-chrome grain containing from 40% to 80% MgO, said grain being substantially all finer than 35 mesh and containing from 25 to 75% −325 mesh material; (2) up to 13% $Cr_2O_3$, substantially all of which passes a 325 mesh screen; (3) from 0.5 to 1.5% dextrin; and (4) from 0.1 to 0.5% methyl cellulose; the amount of $Cr_2O_3$ and the percentage of prereacted grain finer than 325 mesh being such that the linear shrinkage of the mortar upon heating to 1650°C is not over 5%; all percentages of the materials in the composition being by weight and based on the total weight of the composition.

2. Mortar according to claim 1 having a linear shrinkage not over 2% wherein the amounts of $Cr_2O_3$ (C) and −325 mesh prereacted grain (F) conform to the relationship $0.095F - 0.027C^2$ 2.

3. Mortar according to claim 2 wherein the $Cr_2O_3$ has an average particle size of about 1.5 microns.

4. Mortar according to claim 3 containing from 8 to 12% $Cr_2O_3$.

5. Mortar according to claim 4 having about 10% $Cr_2O_3$.

6. Mortar according to claim 5 wherein from 25 to 40% of the prereacted grain passes a 325 mesh screen.

7. Mortar according to claim 6 wherein the prereacted grain contains 60% MgO.

8. Mortar according to claim 1 having a linear shrinkage not over 1% and wherein the amounts of $Cr_2O_3$ (C) and −325 mesh prereacted grain (F) conform to the relationship $$0.095F - 0.027C^2 \quad 1.$$

9. Mortar according to claim 8 wherein the $Cr_2O_3$ has an average particle size of about 1.5 microns.

10. Mortar according to claim 9 containing from 8 to 12% $Cr_2O_3$.

11. Mortar according to claim 10 having about 10% $Cr_2O_3$.

12. Mortar according to claim 11 wherein from 25 to 40% of the prereacted grain passes a 325 mesh screen.

13. Mortar according to claim 12 wherein the prereacted grain contains 60% MgO.

14. Mortar according to claim 1 containing about 10% $Cr_2O_3$ having an average particle size of about 1.5 microns, 1% dextrin, 0.3% methyl cellulose, and about 35% prereacted grain passing a 325 mesh screen.

* * * * *

UNITED STATES PATENT OFFICE
CERTIFICATE OF CORRECTION

Patent No. 3,868,261      Dated February 25, 1975

Inventor(s) Nicholas Cassens, Jr., and Joseph E. Neely

It is certified that error appears in the above-identified patent and that said Letters Patent are hereby corrected as shown below:

Title Page, Title, "Refractory Motor" should be --Refractory Mortar--

Column 1, Line 1, "Refractory Motor" should be --Refractory Mortar--

Column 3, Line 30, "$0.095F - 0.027C^2 \quad 1.$" should be --$0.095F - 0.027C^2 \leq 1.$--

Column 3, Line 48, "3 long, 3/4 wide" should be --3" long, 3/4" wide--

Column 5, Line 9, "$0.095F - 0.027C^2 \quad 2.$" should be --$0.095F - 0.027C^2 \leq 2.$--

Column 6, Line 5, "$0.095F - 0.027C^2 \quad 1.$" should be --$0.095F - 0.027C^2 \leq 1.$--

Signed and sealed this 1st day of July 1975.

(SEAL)
Attest:

RUTH C. MASON
Attesting Officer

C. MARSHALL DANN
Commissioner of Patents
and Trademarks